United States Patent
Higuchi (10) Patent No.: US 12,541,859 B2
(45) Date of Patent: Feb. 3, 2026

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Shugo Higuchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 388 days.

(21) Appl. No.: 18/309,862

(22) Filed: May 1, 2023

(65) Prior Publication Data
US 2023/0368396 A1    Nov. 16, 2023

(30) Foreign Application Priority Data
May 12, 2022    (JP) .................... 2022-078951

(51) Int. Cl.
*G06T 7/194* (2017.01)
*G06T 7/174* (2017.01)

(52) U.S. Cl.
CPC .............. *G06T 7/194* (2017.01); *G06T 7/174* (2017.01); *G06T 2207/20224* (2013.01)

(58) Field of Classification Search
CPC ..................... G06T 7/194; G06T 7/174; G06T 2207/20224; G06T 7/11; G06Q 50/20; G09B 5/065; G06F 3/017; G06F 3/011
USPC ....................................... 382/100
See application file for complete search history.

(56) References Cited

U.S. PATENT DOCUMENTS

| | | | |
|---|---|---|---|
| 10,986,324 B2 | 4/2021 | Higuchi | |
| 11,907,421 B1* | 2/2024 | Clements | G06F 3/013 |
| 2021/0352181 A1* | 11/2021 | Lin et al. | H04N 1/00129 |
| 2022/0014740 A1* | 1/2022 | Baran et al. | H04N 19/119 |
| 2023/0290013 A1* | 9/2023 | Hseih et al. | G06T 11/00 |

FOREIGN PATENT DOCUMENTS

JP        2006-162692 A    6/2006

OTHER PUBLICATIONS

Sony Inc., "Release of "Edge Analytics Appliance" to support creative video production in real time by a video analysis technique applying independently developed AI ·X·1" (May 2015) pp. 1-5, <URL:https://www.sony.com/ja/SonyInfo/News/Press/201905/19-041>.

* cited by examiner

*Primary Examiner* — Matthew C Bella
*Assistant Examiner* — Daniel Joseph Santos
(74) *Attorney, Agent, or Firm* — Carter, DeLuca & Farrell LLP (57) ABSTRACT

An image processing apparatus comprises one or more processors, and one or more memories storing executable instructions which, when executed by the one or more processors, cause the image processing apparatus to function as: a specification unit configured to specify, on a basis of a difference between a first region, corresponding to a foreground region of a target frame, in a background image corresponding to the target frame in a buffered frame group and a second region, corresponding to the foreground region, in a background image of each of frames after the target frame in the buffered frame group, a background image among the background images of the frames; and an output unit configured to output the specified background image.

15 Claims, 7 Drawing Sheets

IMAGE PROCESSING APPARATUS, IMAGE PROCESSING METHOD, AND NON-TRANSITORY COMPUTER-READABLE STORAGE MEDIUM

BACKGROUND

Field

The present disclosure relates to an image processing technology.

Description of the Related Art

In recent years, with the development of Internet technology, introduction of an e-learning system by real-time delivery or on-demand delivery of lectures has been advanced in education sites. The e-learning system includes content in which a PC displays a slide or an electronic whiteboard digitizes writings on blackboard, as well as many pieces of content in which a lecture using a common blackboard is merely photographed by a camera. A technology of displaying the content of wiring on the blackboard in an easily visible manner also in a lecture using the common blackboard is disclosed.

For example, the technology disclosed in Japanese Patent Laid-Open No. 2006-162692 creates vector data from a region of writing on the blackboard extracted from an image, and synthesizes and displays the vector data in separate windows, thereby making the blackboard writing information easy to see.

The technology disclosed in Internet <URL: https://www.sony.com/ja/SonyInfo/News/Press/201905/19-041> [Searched on Apr. 26, 2022] extracts already written characters and figures and displays them in an overlay manner, whereby the blackboard writing information that has become invisible due to the lecturer shielding it is made visible.

However, these related arts cannot display the content of the blackboard in an easily visible manner in a situation where the lecturer shields written characters by his/her head or a part of body when writing on the blackboard. When the lecturer stays at the place or writes on a blackboard while talking, it is after a while that the content of the blackboard becomes visible. Therefore, when the content of the blackboard becomes visible, the lecturer's speech goes ahead, which is one of the factors that hinder the viewer from understanding the content of the lecture.

SUMMARY

The present disclosure provides a technology that can output content of a background hidden by a foreground even if the background is updated.

According to the first aspect of the present disclosure, there is provided an image processing apparatus comprising: one or more processors; and one or more memories storing executable instructions which, when executed by the one or more processors, cause the image processing apparatus to function as: a specification unit configured to specify, on a basis of a difference between a first region, corresponding to a foreground region of a target frame, in a background image corresponding to the target frame in a buffered frame group and a second region, corresponding to the foreground region, in a background image of each of frames after the target frame in the buffered frame group, a background image among the background images of the frames; and an output unit configured to output the specified background image.

According to the second aspect of the present disclosure, there is provided an image processing method performed by an image processing apparatus, the image processing method comprising: specifying, on a basis of a difference between a first region, corresponding to a foreground region of a target frame, in a background image corresponding to the target frame in a buffered frame group and a second region, corresponding to the foreground region, in a background image of each of frames after the target frame in the buffered frame group, a background image among the background images of the frames; and outputting the specified background image.

According to the third aspect of the present disclosure, there is provided a non-transitory computer-readable storage medium storing a computer program for causing a computer to function as a specification unit configured to specify, on a basis of a difference between a first region, corresponding to a foreground region of a target frame, in a background image corresponding to the target frame in a buffered frame group and a second region, corresponding to the foreground region, in a background image of each of frames after the target frame in the buffered frame group, a background image among the background images of the frames; and an output unit configured to output the specified background image.

Further features of the present disclosure will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed disclosure. Multiple features are described in the embodiments, but limitation is not made to an disclosure that requires all such features, and multiple such features may be combined as appropriate. Furthermore, in the attached drawings, the same reference numerals are given to the same or similar configurations, and redundant description thereof is omitted.

First Embodiment

Figure 1:
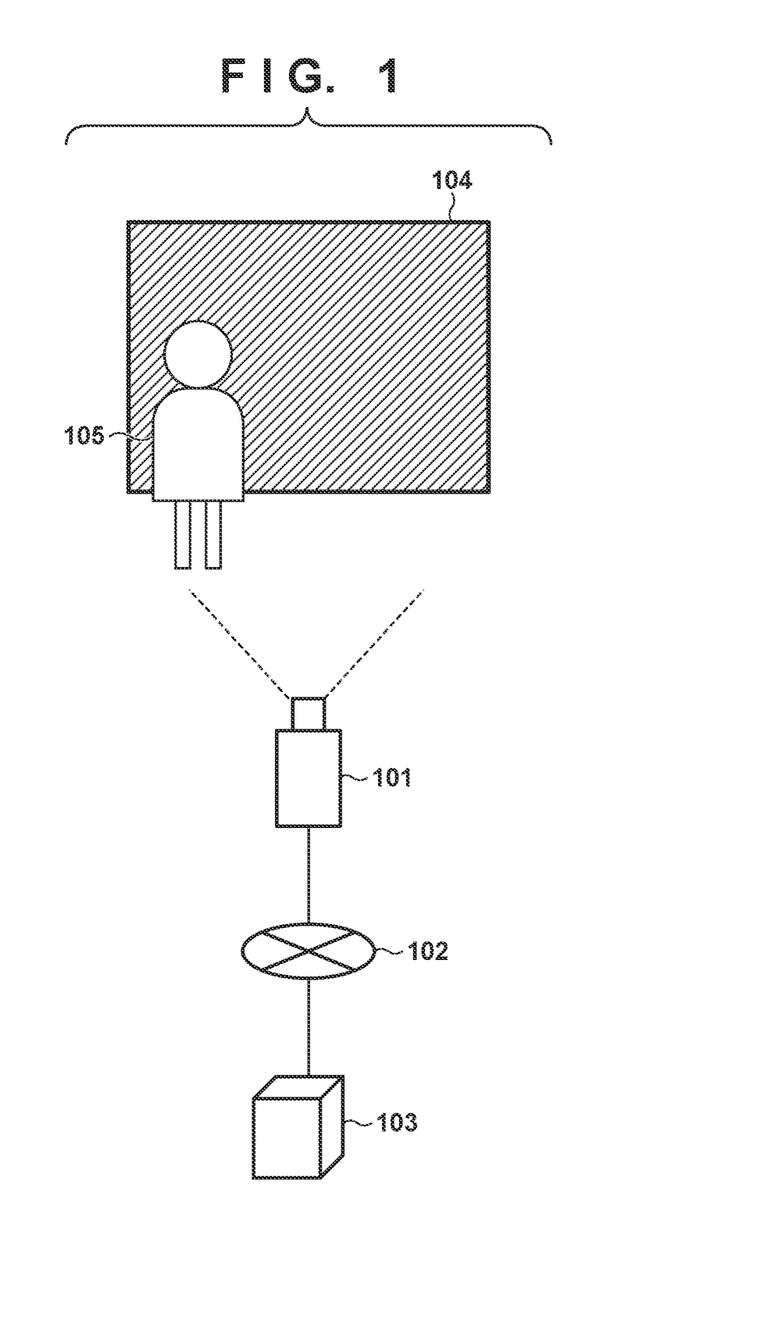
FIG. 1 is a diagram illustrating a configuration example of a system.

In the present embodiment, a system applied to an e-learning system will be described. In the system according to the present embodiment, as illustrated in FIG. 1, the camera 101 captures a scene where a lecturer 105 positioned on the front side of a blackboard 104 (the front side as viewed from the camera 101) gives a lecture using the blackboard 104. The camera 101 transmits each captured frame (captured image) to the image processing apparatus 103 via a wired or wireless network 102. The image processing apparatus 103 displays each frame received from the camera 101 via the network 102. At that time, regarding a background hidden by the foreground (lecturer 105) in a reproduction target frame, in a case where a difference occurs in a region corresponding to the foreground in a subsequent frame after the reproduction target frame, the image processing apparatus 103 displays the subsequent frame.

The configuration illustrated in FIG. 1 is an example, and the present system is not limited to such a configuration. For example, the number of cameras 101 is not limited to one, and may be two or more. The system may include apparatuses such as a server apparatus that performs operation of the camera 101 and control of image transmission and an apparatus that relays data communication.

Figure 2:
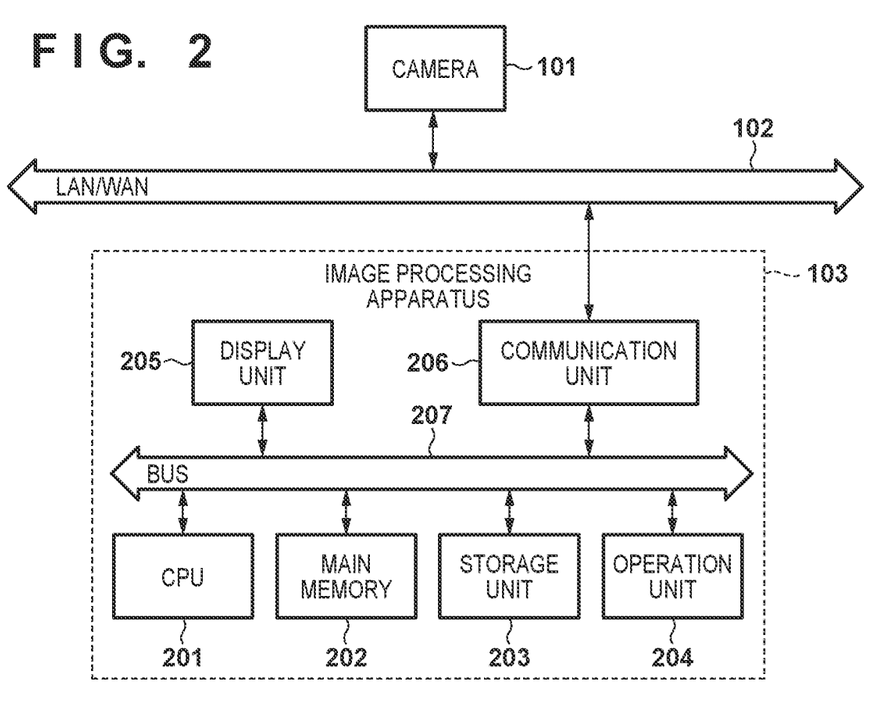
FIG. 2 is a block diagram illustrating a hardware configuration example of the system.

Next, a hardware configuration example of the system according to the present embodiment will be described with reference to the block diagram of FIG. 2. In the present embodiment, for specific description, as illustrated in FIG. 2, it is assumed that the camera 101 and the image processing apparatus 103 are connected to a LAN/WAN, which is an example of the network 102. However, the network configuration between the camera 101 and the image processing apparatus 103 is not limited to a specific network configuration.

First, the camera 101 will be described. As illustrated in FIG. 1, the camera 101 captures a scene where the lecturer 105 gives a lecture using the blackboard 104. The camera 101 may be an apparatus that captures a moving image of the scene, or may be an apparatus that regularly or irregularly captures the scene. In the former case, the camera 101 transmits each frame in the captured moving image to the image processing apparatus 103 via the network 102. In the latter case, the camera 101 transmits a still image captured regularly or irregularly as a frame to the image processing apparatus 103 via the network 102.

Next, the image processing apparatus 103 will be described. As the image processing apparatus 103, for example, a computer apparatus such as a personal computer (PC), a smartphone, or a tablet terminal apparatus can be applied.

A CPU 201 executes various types of processing using a computer program and data stored in the main memory 202. Due to this, the CPU 201 controls the operation of the entire image processing apparatus 103, and executes or controls various types of processing described as being performed by the image processing apparatus 103.

The main memory 202 has an area for storing computer programs and data loaded from a storage unit 203 and an area for storing (buffering) frames received from the camera 101 via a communication unit 206. Furthermore, the main memory 202 has a work area used when the CPU 201 executes various types of processing. As described above, the main memory 202 can appropriately provide various types of areas.

The storage unit 203 is a large-capacity information storage apparatus such as a hard disk drive. The storage unit 203 stores an operating system (OS), computer programs and data for causing the CPU 201 to execute or control various types of processing described as being performed by the image processing apparatus 103, and the like. The computer programs and data stored in the storage unit 203 are appropriately loaded into the main memory 202 under the control of the CPU 201, and become processing targets of the CPU 201. For example, a nonvolatile memory such as a silicon disk can be applied to the storage unit 203.

An operation unit 204 is a user interface such as a keyboard, a mouse, a button, a mode dial, a switch, a lever, or a touchscreen, and can input various types of instructions to the CPU 201 by a user operation.

A display unit 205 is an apparatus having a liquid crystal screen or a touchscreen, and can display a processing result by the CPU 201 as an image, characters, or the like. In a case where the display unit 205 has a touchscreen, various types of instructions input by the user operating the touchscreen are notified to the CPU 201. The display unit 205 may be a projection apparatus such as a projector that projects images, characters, and the like.

The communication unit 206 is a device conforming to a communication standard such as Ethernet or IEEE 802.11, and is a device for connecting the image processing apparatus 103 to the network 102. The image processing apparatus 103 can perform data communication with the camera 101 on the network 102 via the communication unit 206.

The CPU 201, the main memory 202, the storage unit 203, the operation unit 204, the display unit 205, and the communication unit 206 are all connected to a bus 207.

Figure 3:
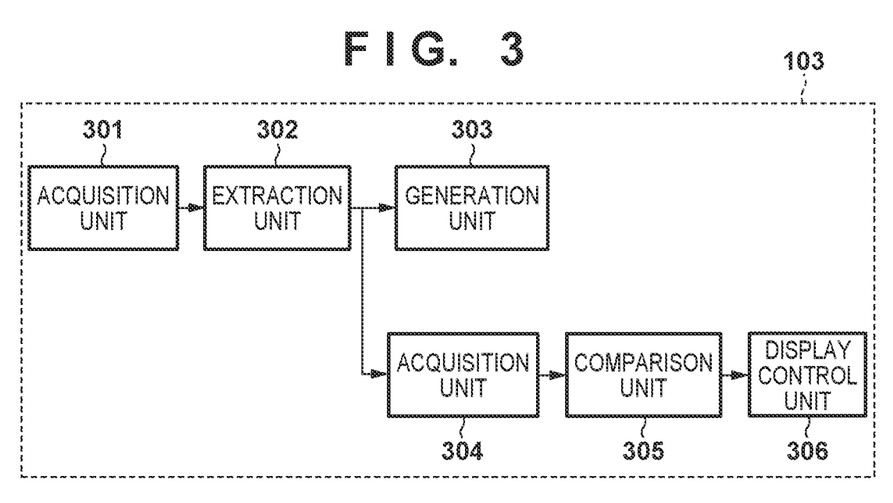
FIG. 3 is a block diagram illustrating a functional configuration example of an image processing apparatus 103.

A functional configuration example of the image processing apparatus 103 according to the present embodiment is illustrated in the block diagram of FIG. 3. It is assumed that each functional unit illustrated in FIG. 3 is implemented by software (computer program). Hereinafter, a functional unit of FIG. 3 will be described as a processing entity, but in practice, the function of the functional unit is achieved by the CPU 201 executing a computer program corresponding to the functional unit. One or more of the functional units illustrated in FIG. 3 may be implemented by hardware.

First, processing performed when the image processing apparatus 103 acquires a frame captured by the camera 101 will be described with reference to the flowchart of FIG. 4.

In step S401, an acquisition unit 301 acquires a frame captured by the camera 101, and stores (buffers) the acquired frame in the main memory 202. The acquisition unit 301 may acquire the frame from the camera 101 via the network 102 and the communication unit 206, or may acquire the frame from an external apparatus such as a server apparatus holding the frame captured by the camera 101. That is, the frame acquisition method is not limited to a specific acquisition method. The acquisition unit 301 may acquire each frame obtained by decoding an encoded moving image, or may acquire, as a frame, a still image captured regularly or irregularly.

Figure 6:
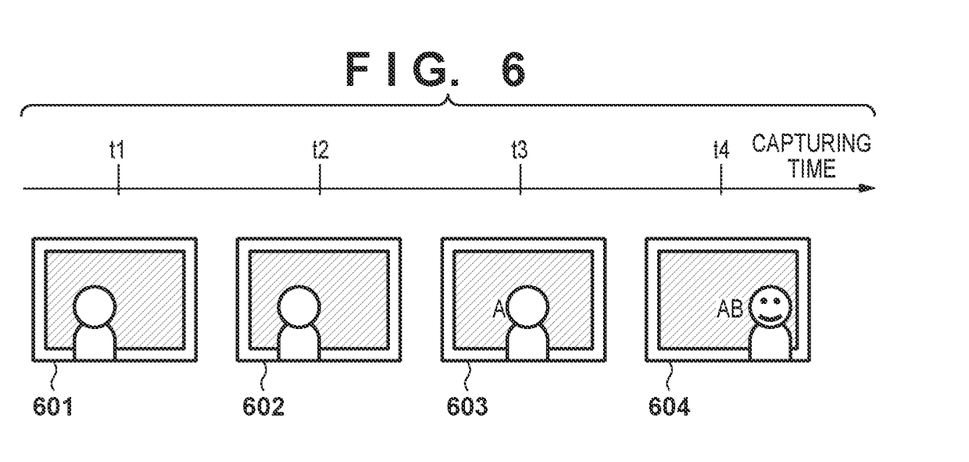
FIG. 6 is a view illustrating an example of a frame group.

Hereinafter, as an example, as illustrated in FIG. 6, a case where frames 601 to 604 are acquired in order of the frames 601, 602, 603, and 604 will be described. The frames 601, 602, 603, and 604 are frames captured at capturing times t1, t2, t3, and t4, respectively, where the capturing time t1 is the oldest capturing time, and the capturing time t4 is the latest capturing time. The frames 601, 602, 603, and 604 are frames obtained by capturing a scene in which the lecturer 105 writes characters "AB" on the blackboard 104 on which nothing is written.

Next, in step S402, an extraction unit 302 extracts (specifies) a foreground region in the frame acquired in step S401. The foreground region is a region of the foreground (subject) that shields the background in the frame, and in the present embodiment, the extraction unit 302 extracts, as the foreground region, the region of the lecturer 105 that shields the blackboard 104. As a method of extracting a foreground region from a frame, a background subtraction method is well known, which is to extract, as a background region, a region (difference region) having a difference between a reference background image and a frame. The reference background image can be acquired by generating it by a method such as calculating a time average for each pixel from continuously captured images, or by capturing in advance an image in which no subject is present. The background image may be a captured image that does not include the foreground. The foreground region may be extracted using a detector that detects a specific region such as a face or a body of a person, or the foreground region may be extracted on the basis of phase difference information (defocus amount) in any pixel using a capturing element that can perform focus detection of a phase difference method.

In the present embodiment, the foreground region is extracted by the background subtraction method with reference to the background image of a previous frame (frame acquired last time). In a case where there is no background image of the previous frame, a background image captured in advance is used. By calculating an image feature amount such as a histogram or a shape of the foreground region in a frame and performing clustering processing, it is possible to extract a foreground region with little noise. However, the extraction method of the foreground region applicable to step S402 is not limited to a specific extraction method.

Next, in step S403, a generation unit 303 processes the foreground region in the frame acquired in step S401 to generate, as a background image, a processed frame in which the foreground is removed from the frame, and stores the generated background image in the main memory 202. For example, the generation unit 303 generates, as the background image, the processed frame in which the pixel value of a pixel in the foreground region in the frame acquired in step S401 is replaced with another pixel value. The "another pixel value" may be an average value of pixel values of pixels positioned around the foreground region in the frame acquired in step S401, for example. The "another pixel value" may be, for example, an average value of pixel values of pixels in a corresponding region corresponding to the foreground region in another image (for example, a background image in which a background where no subject is present is captured in advance). In the present embodiment, a partial image in the foreground region in the frame acquired in step S401 is replaced with a partial image in the corresponding region corresponding to the foreground region in the frame acquired last time. However, there are various methods for generating, as a background image, a processed frame in which the foreground is removed from the frame acquired in step S401, and the method is not limited to a specific method.

As described above, upon acquiring a frame, the image processing apparatus 103 generates and stores, in the main memory 202, a background image corresponding to the frame. Therefore, the image processing apparatus 103 generates and stores, in the main memory 202, a corresponding background image for each frame buffered in the main memory 202.

Figure 5:
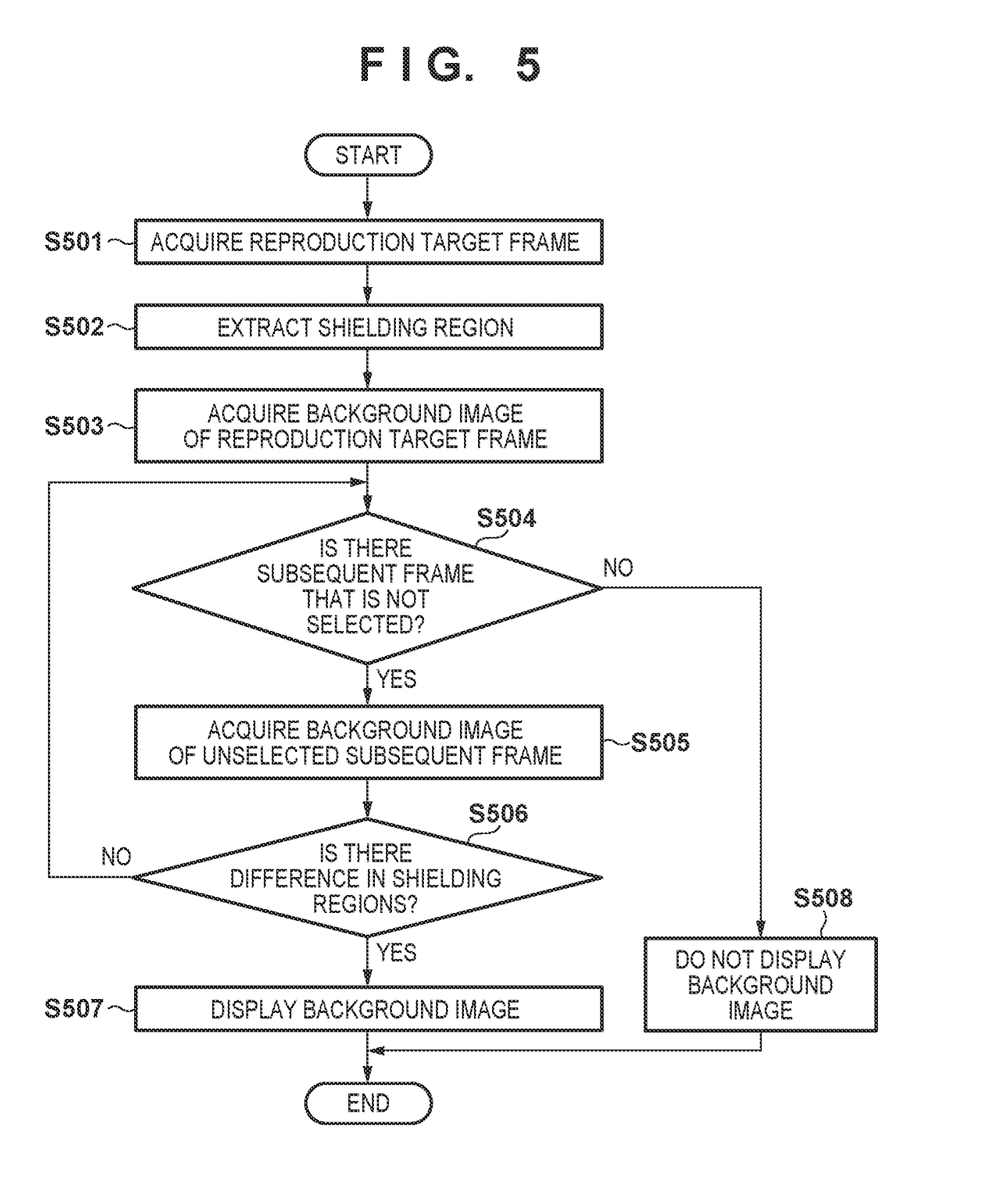
FIG. 5 is a flowchart of processing performed by the image processing apparatus 103 to reproduce a reproduction target frame in a frame group buffered in a main memory 202.

Next, the processing performed by the image processing apparatus 103 to reproduce a reproduction target frame in a frame group buffered in the main memory 202 will be described with reference to the flowchart of FIG. 5. The processing according to the flowchart of FIG. 5 illustrates processing related to reproduction of one frame. The CPU 201 enables reproduction of a plurality of frames by repeatedly executing the processing according to the flowchart of FIG. 5.

In the present embodiment, upon receiving a frame via the network 102 and the communication unit 206, the CPU 201 stores (buffers) the received frame in the main memory 202. Then, when a predetermined time has elapsed after buffering is started, the CPU 201 causes the display unit 205 to display that a frame reproduction instruction can be input. The CPU 201 may cause the display unit 205 to display that a frame reproduction instruction can be input when a predetermined number of frames are stored in the main memory 202 after buffering is started. Upon detecting that the user inputs a frame reproduction instruction by operating the operation unit 204, the CPU 201 starts the processing according to the flowchart of FIG. 5. The CPU 201 may start the processing according to the flowchart of FIG. 5 without receiving a frame reproduction instruction from the user when the predetermined time elapses after buffering is started, or when the predetermined number of frames are stored in the main memory 202 after buffering is started.

In any case, in the present embodiment, it is assumed that when a frame stored in the main memory 202 is reproduced, the main memory 202 stores one or more frames (frames whose capturing time is more recent than that of the frame to be reproduced) after the frame to be reproduced.

In step S501, the acquisition unit 301 acquires the reproduction target frame from the frame group (buffered frame group) buffered in the main memory 202. The reproduction target frame may be a frame designated from the buffered frame group by the user operating the operation unit 204, or may be a frame selected from the buffered frame group by the CPU 201 on an appropriate basis. The reproduction target frame may be the oldest frame in the buffered frame group.

In step S502, the extraction unit 302 extracts the foreground region in the reproduction target frame acquired in step S501 as a shielding region (region of the subject that shields the background) by a method similar to the above-described step S402.

Figure 4:
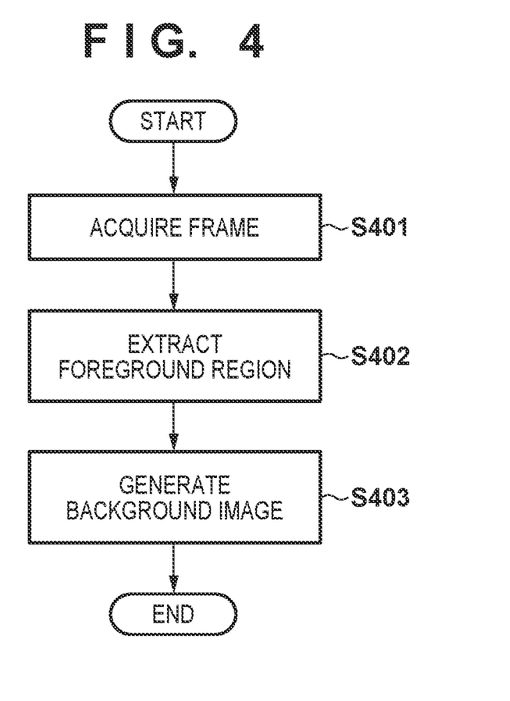
FIG. 4 is a flowchart of processing performed when the image processing apparatus 103 acquires a frame captured by a camera 101.

In step S503, the acquisition unit 304 acquires, from the main memory 202, the background image corresponding to the reproduction target frame acquired in step S501 (background image generated by the processing according to the flowchart in FIG. 4 for the reproduction target frame).

In step S504, the comparison unit 305 determines whether or not "a subsequent frame that is not selected as a selected frame remains in a subsequent frame (frame whose capturing time is more recent than that of the reproduction target frame) after the reproduction target frame in the buffered frame group". The subsequent frame may be as many frames as the number of N (N is a natural number) frames after the reproduction target frame in the buffered frame group (as many frames as the number of N frames whose capturing time is more recent than that of the reproduction target frame).

As a result of such determination, in a case where "a subsequent frame that is not selected as a selected frame remains among subsequent frames after the reproduction target frame in the buffered frame group", the processing proceeds to step S505. On the other hand, in a case where "all the subsequent frames after the reproduction target frame in the buffered frame group are selected as the selected frames", the processing proceeds to step S508.

In step S505, the comparison unit 305 selects, as the selected frame, the subsequent frame having the oldest capturing time among the unselected subsequent frames after the reproduction target frame in the buffered frame group, and acquires the background image generated by the processing according to the flowchart of FIG. 4 for the selected frame.

In step S506, the comparison unit 305 obtains a difference between a first corresponding region corresponding to the shielding region in the background image acquired in step S503 and a second corresponding region corresponding to the shielding region in the background image acquired in step S505. The comparison unit 305 obtains, as a difference between the first corresponding region and the second corresponding region, a sum of difference values (absolute values) of pixel values between pixels positionally corresponding to each other in the first corresponding region and the second corresponding region, for example. The difference between the first corresponding region and the second corresponding region may be a value obtained by another method as long as it is a value obtained by quantifying the magnitude of the difference between the first corresponding region and the second corresponding region.

Then, if the obtained difference is equal to or greater than a threshold, the comparison unit 305 determines that there is a difference between the first corresponding region and the second corresponding region, and the processing proceeds to step S507. On the other hand, if the obtained difference is less than the threshold, the comparison unit 305 determines that there is no difference between the first corresponding region and the second corresponding region, and the processing proceeds to step S504. How to use the difference between the first corresponding region and the second corresponding region to determine whether or not there is a difference between the first corresponding region and the second corresponding region is not limited to a specific determination method.

In step S507, a display control unit 306 specifies, as a display target background image, the background image acquired in step S505 (background image determined to have a difference between the first corresponding region and the second corresponding region), and causes the display unit 205 to display the specified background image. Various display methods are conceivable as the display method of the background image acquired in step S505.

Figure 8:
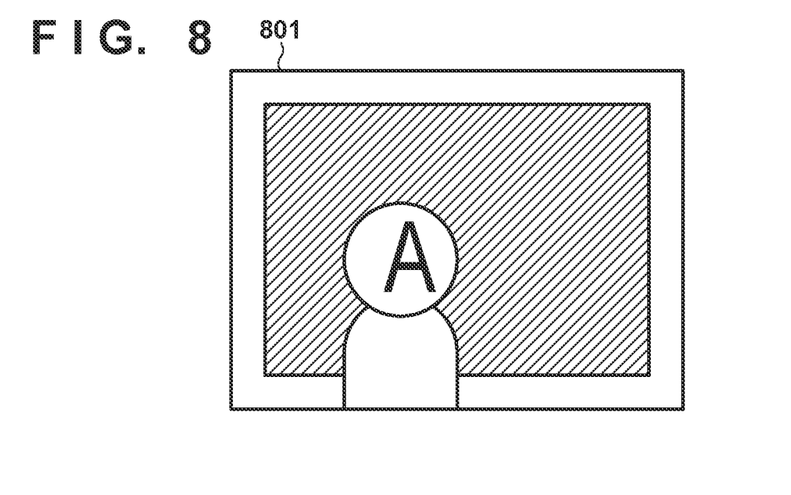
FIG. 8 is a view illustrating an example of a synthesis frame.

For example, as illustrated in FIG. 8, the display control unit 306 may generate a synthesis frame 801 in which the background image acquired in step S505 is translucently superimposed on the reproduction target frame acquired in step S501 (for example, an a value of the background image is controlled to be processed into a translucent image, and the processed image is superimposed on the reproduction target frame), and cause the display unit 205 to display the generated synthesis frame. At that time, the display control unit 306 may display the corresponding region corresponding to the shielding region and the region other than the corresponding region in the synthesis frame by different display methods. For example, the display control unit 306 may change the brightness or color tone between the corresponding region corresponding to the shielding region and a region other than the corresponding region, or may display an edge sharply to make the corresponding region corresponding to the shielding region conspicuous. The difference between the shielding regions may be displayed as PinP (Picture In Picture) or may be displayed on another screen. Due to this, in a case where the shielding region is updated between frames, the updated shielding region can be acquired from the frame at the time of the buffering destination, and displayed being given to the reproduction target frame. The display control unit 306 may display each of the reproduction target frame and the background image acquired in step S505 in a separate display region on the display screen of the display unit 205.

On the other hand, in step S508, the display control unit 306 causes the display unit 205 to display the reproduction target frame acquired in step S501. In step S508, the background image is not displayed.

A specific comparison operation in the comparison unit 305 will be described with reference to FIG. 7 as an example. A background image 701 is a background image of the frame 601 captured at the capturing time t1, and a background image 702 is a background image of the frame 602 captured at the capturing time t2. A background image 703 is a background image of the frame 603 captured at the capturing time t3, and a background image 704 is a background image of the frame 604 captured at the capturing time t4. Hereinafter, a case where the frame 601 is reproduced as a reproduction target frame in a state where the frames 601 to 604 are buffered in the main memory 202 will be described.

A region 705 indicated by a dotted line in the background image 701 is a corresponding region corresponding to the shielding region in the frame 601. A region 706 indicated by a dotted line in the background image 702 is a corresponding region corresponding to the shielding region in the frame 601. A region 707 indicated by a dotted line in the background image 703 is a corresponding region corresponding to the shielding region in the frame 601. A region 708 indicated by a dotted line in the background image 704 is a corresponding region corresponding to the shielding region in the frame 601.

In this case, first, the comparison unit 305 determines whether or not there is a difference between the region 705 and the region 706. In FIG. 7, since there is no difference between the region 705 and the region 706, next, the comparison unit 305 determines whether or not there is a difference between the region 705 and the region 707. In FIG. 7, since there is a difference between the region 705 and the region 707, the background image 703 is selected as a display target. FIG. 8 illustrates an example of the synthesis frame 801 in which the background image 703 is translucently superimposed (for example, the a value of the background image 703 is controlled to be processed into a translucent image, and the processed image is superimposed on the frame 601 of the reproduction target) on the frame 601 of the reproduction target.

As described above, according to the present embodiment, even in a situation where the characters written on the blackboard are shielded by the subject such as the head or a part of the body of the lecturer, the blackboard can be displayed so as to be easily visible. Due to this, since the writing on the blackboard is displayed in synchronization with the utterance of the lecturer, the viewer can easily understand the lecture.

In the present embodiment, a mode has been described in which the background image acquired in step S505 is displayed on the display unit 205, but the output destination of the background image is not limited to the display unit

205. For example, the background image and a synthesis frame obtained by synthesizing the background image with a translucent reproduction target frame may be transmitted to an external apparatus via the communication unit 206 and the network 102.

Second Embodiment

In the present embodiment, differences from the first embodiment will be described, and it is assumed that the present embodiment is similar to the first embodiment unless otherwise specified.

In the case illustrated in FIG. 6, in a case where the lecturer writes a cohesive piece of information (a "cohesion") such as a drawing, a mathematical expression, and a sentence on the blackboard, there is a case where displaying the entire cohesion is convenient for the viewer. Therefore, in the present embodiment, a configuration will be described in which a set of regions having a difference is acquired from a subsequent frame and synthesized on the reproduction target frame and displayed.

Figure 9:
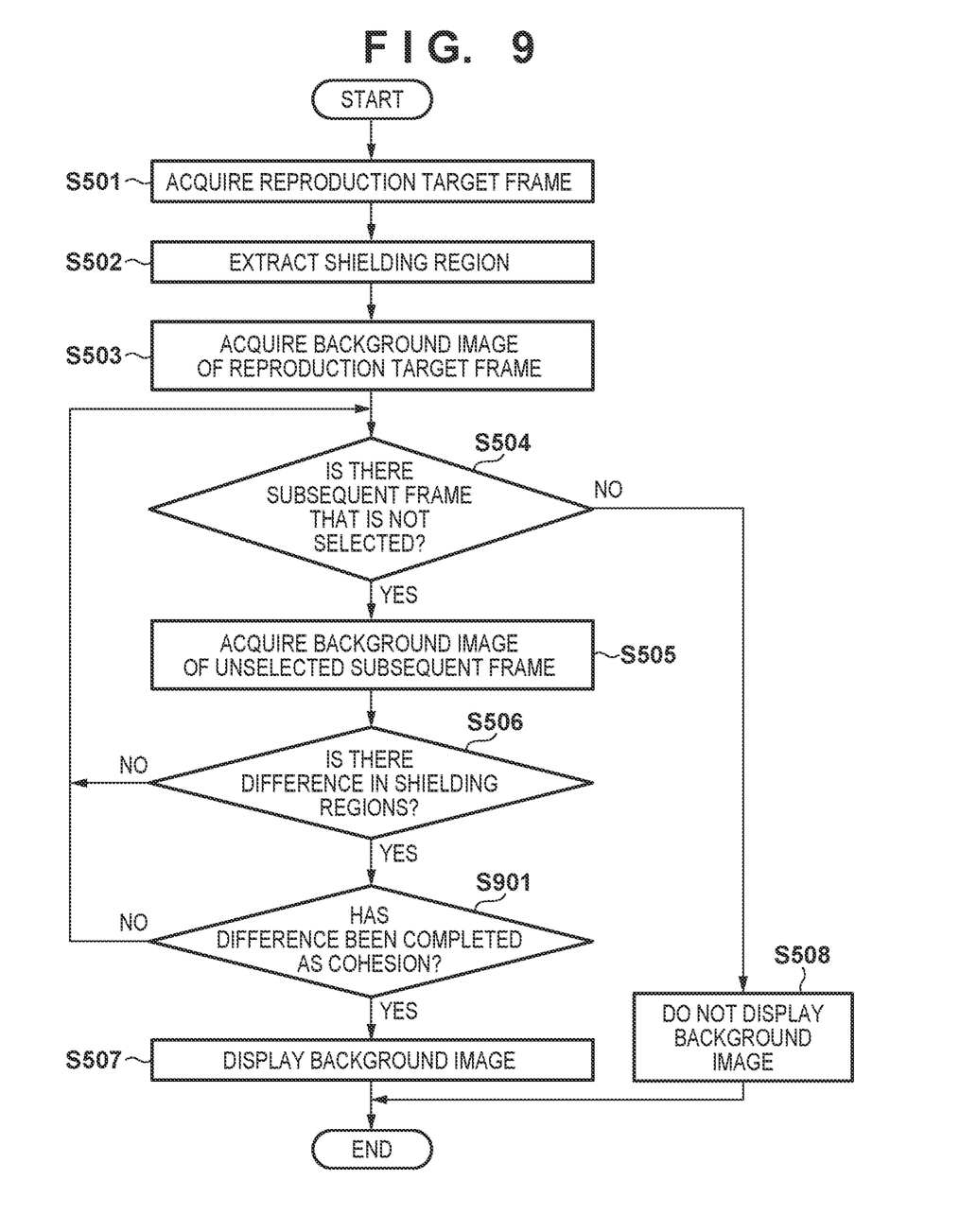
FIG. 9 is a flowchart of processing performed by the image processing apparatus 103 to reproduce a reproduction target frame in a frame group buffered in the main memory 202.

The processing performed by the image processing apparatus 103 to reproduce a reproduction target frame in a frame group buffered in the main memory 202 will be described with reference to the flowchart of FIG. 9. In FIG. 9, the same processing steps as the processing steps illustrated in FIG. 5 are denoted by the same step numbers, and the description related to the processing steps will be omitted.

In step S901, the comparison unit 305 determines "whether or not the difference in the shielding regions has been completed as a cohesion". Here, a determination method for determining "whether or not the difference in the shielding regions has been completed as a cohesion" will be described.

For example, the comparison unit 305 may determine "whether or not the difference in the shielding regions has been completed as a cohesion" on the basis of the orientation of the face of the lecturer in the frame. For example, when writing on the blackboard, the lecturer turns his/her back to the camera 101, and therefore only the back of the head appears in many cases. Since the lecturer returns the line of sight to the direction of the camera 101 upon completing writing on the blackboard, the lecturer faces the front in many cases. Therefore, the comparison unit 305 determines that "the difference in the shielding regions has been completed as a cohesion" at a time point when it is determined that the face faces the front (faces the camera 101) in a subsequent frame after the reproduction target frame in the buffered frame group. Since the technology for determining the orientation of the face of the person in the frame is a well-known technology, the description related to it will be omitted.

The comparison unit 305 may determine "whether or not the difference in the shielding regions has been completed as a cohesion" on the basis of the voice recognition result of the lecturer. For example, when the lecturer writes on the blackboard while giving an explanation, the content of the voice and the content of the blackboard match, and therefore it is desirable to display the difference between the shielding regions for each cohesion of the content of the voice. Therefore, upon recognizing the voice of the lecturer collected through a voice collection apparatus such as a microphone included in the image processing apparatus 103 and detecting the end of a sentence or the break of a word, the comparison unit 305 determines that "the difference in the shielding regions has been completed as a cohesion".

The comparison unit 305 may determine "whether or not the difference in the shielding regions has been completed as a cohesion" on the basis of the detection result of the motion such as the gesture of the lecturer. For example, the lecturer performs an operation of holding a piece of chalk in the hand when writing on the blackboard and returning the piece of chalk to the original position upon completing the writing on the blackboard. Therefore, the comparison unit 305 determines that "the difference in the shielding regions has been completed as a cohesion" at a time point when it is determined that the lecturer has performed an operation of lowering his/her arm in a frame after the reproduction target frame in the buffered frame group. Since the technology for determining the operation of the person in the frame is a well-known technology, the description related to it will be omitted.

A voice or an operation indicating that "the difference in the shielding regions has been completed as a cohesion" may be registered in the storage unit 203 in advance, and the comparison unit 305 may determine that "the difference in the shielding regions has been completed as a cohesion" at a time point when it is detected that the lecturer has uttered the voice or has performed the operation. This allows the lecturer to control the section desired to display as a cohesion, and therefore the lecturer can notify the viewer of the cohesion written on the blackboard desired to convey. It is possible to provide display convenient for the viewer, such as continuing to display the writing on the blackboard before the erasure, for a period until the next writing on the blackboard is started in a case where there is an operation such as erasing writing on the blackboard.

Then, as a result of such determination, in a case where it is determined that "the difference in the shielding regions has been completed as a cohesion", the processing proceeds to step S507, and in a case where it is not determined that "the difference in the shielding regions has been completed as a cohesion", the processing proceeds to step S504.

In step S507, the display control unit 306 causes the display unit 205 to display the background image acquired in recent step S505. The "background image acquired in recent step S505" is a background image of a frame at the capturing time corresponding to the timing at which it is determined that "the difference in the shielding regions has been completed as a cohesion". The background image of the frame at the capturing time corresponding to the timing at which it is determined that "the difference in the shielding regions has been completed as a cohesion" is, for example, a background image of the frame at the capturing time after the timing at which it is determined that "the difference in the shielding regions has been completed as a cohesion" and closest to the timing.

Figure 7:
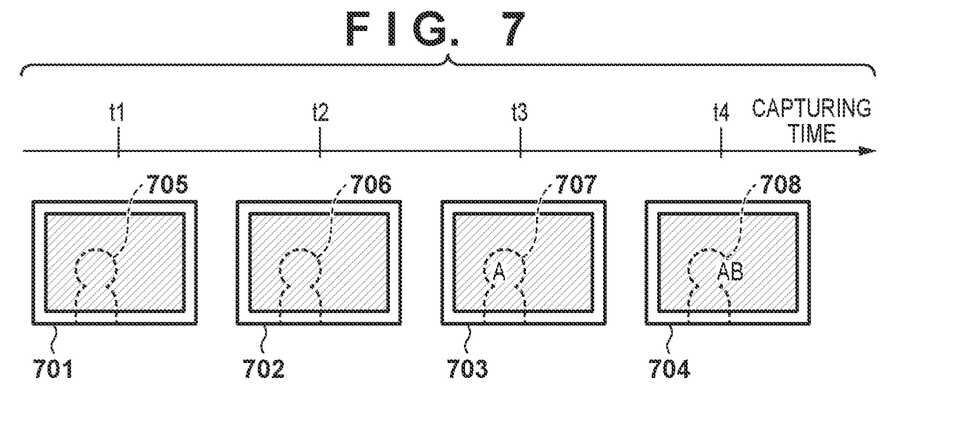
FIG. 7 is a view illustrating an example of a specific comparison operation in a comparison unit 305.

In the example of FIG. 7, since there is no difference between the region 705 and the region 706, next, the comparison unit 305 determines whether or not there is a difference between the region 705 and the region 707. In FIG. 7, there is a difference between the region 705 and the region 707. However, since it is not determined that "the difference in the shielding regions has been completed as a cohesion", for example, the lecturer is not facing front at this time point, the comparison unit 305 next determines whether or not there is a difference between the region 705 and the region 708. In FIG. 7, since there is a difference between the region 705 and the region 708 and it is determined that "the difference in the shielding regions has been completed as a cohesion", for example, the lecturer has faced the front at this time point, the background image 704 is selected as a display target.

Figure 10:
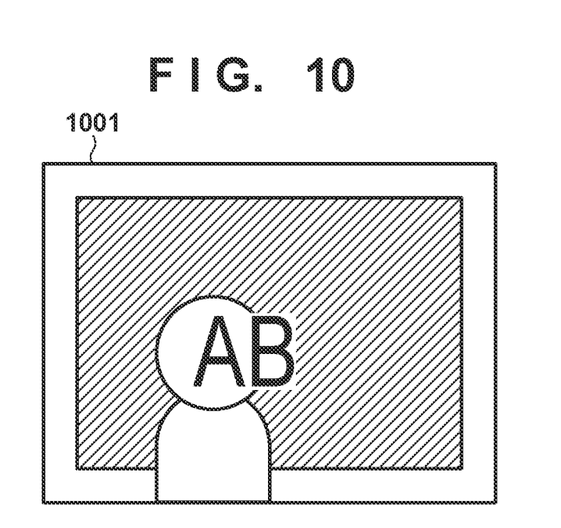
FIG. 10 is a view illustrating an example of a synthesis frame.

FIG. 10 illustrates an example of a synthesis frame 1001 in which the background image 704 is translucently superimposed (for example, the a value of the background image 704 is controlled to be processed into a translucent image, and the processed image is superimposed on the frame 601 of the reproduction target) on the frame 601 of the reproduction target.

As described above, according to the present embodiment, since in a case where the lecturer writes a cohesive piece of information such as a drawing, a mathematical expression, and a sentence on the blackboard, the entire cohesion can be displayed, and thus the viewer can more easily understand the lecture. That is, in a case of detecting an occurrence of a specific event, the image processing apparatus 103 outputs the background image of the frame at the capturing time corresponding to the detection timing among the background images acquired in step S505.

In the first embodiment and the second embodiment, the case of displaying a frame in which a scene where the lecturer gives the lecture using the blackboard is captured has been described as an example, but the present disclosure is not limited to such a case.

Alternatively, the numerical values, processing timings, processing orders, processing entities, and data (information) transmission destinations/transmission sources/storage locations, and the like used in the embodiments described above are referred to for specific description as an example, and are not intended for limitation to these examples.

Alternatively, some or all of the embodiments described above may be used in combination as appropriate. Alternatively, some or all of the embodiments described above may be selectively used.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-078951, filed May 12, 2022, which is hereby incorporated by reference herein in its entirety.

What is claimed is:

1. An image processing apparatus comprising:
one or more processors; and
one or more memories storing executable instructions which, when executed by the one or more processors, cause the image processing apparatus to:
specify, on a basis of a difference between a first region, corresponding to a foreground region of a target frame, in a background image corresponding to the target frame in a buffered frame group and a second region, corresponding to the foreground region, in a background image of each of frames after the target frame in the buffered frame group, a background image among the background images of the frames; and
output the specified background image,
wherein the difference is obtained sequentially from a background image of a frame having a capturing time earlier than the target frame with respect to a background image of a frame having a capturing time more recent than the target frame in the buffered frame group,
wherein a background image is specified to be output among the background images of the frames based on the obtained difference, and
wherein a background image is specified in which the obtained difference is greater than a threshold.

2. The image processing apparatus according to claim 1, wherein the instructions, when executed by the one or more processors, further cause the image processing apparatus to generate a background image not including a foreground in a buffered frame.

3. The image processing apparatus according to claim 2, wherein the instructions, when executed by the one or more processors, further cause the image processing apparatus to generate, as a background image, a processed frame in which a pixel value of a pixel in the foreground region in a buffered frame is replaced with another pixel value.

4. The image processing apparatus according to claim 3, wherein said another pixel value is an average value of pixel values of pixels positioned around a foreground region in a buffered frame.

5. The image processing apparatus according to claim 3, wherein said another pixel value is an average value of pixel values of pixels in a region, corresponding to a foreground region of the buffered frame, in a background image in which a background where no subject is present is captured in advance.

6. The image processing apparatus according to claim 2, wherein the instructions, when executed by the one or more processors, further cause the image processing apparatus to generate a processed frame in which a partial image in a foreground region in a buffered frame is replaced with a partial image in a region, corresponding to the foreground region, in a frame acquired last time.

7. The image processing apparatus according to claim 1, wherein the instructions, when executed by the one or more processors, further cause the image processing apparatus to output a synthesis frame in which the specified background image is translucently synthesized with the target frame.

8. The image processing apparatus according to claim 7, wherein the instructions, when executed by the one or more processors, further cause the image processing apparatus to display, using display methods different from each other, a correspondence region corresponding to the foreground region and a region other than the correspondence region in the synthesis frame.

9. The image processing apparatus according to claim 1, wherein the instructions, when executed by the one or more processors, further cause the image processing apparatus to:
   detect an occurrence of a specific event; and
   output a background image of a frame at a capturing time corresponding to a timing at which the image processing apparatus detects a specific event among specified background images.

10. The image processing apparatus according to claim 9, wherein the instructions, when executed by the one or more processors, further cause the image processing apparatus to output a background image of a frame at a capturing time corresponding to a timing at which the image processing apparatus detects that a face of a person faces a front in a frame after the target frame in the buffered frame group.

11. The image processing apparatus according to claim 9, wherein the instructions, when executed by the one or more processors, further cause the image processing apparatus to output a background image of a frame at a capturing time corresponding to a timing at which the image processing apparatus detects an end of a sentence or a break of a word in a voice recognition result.

12. The image processing apparatus according to claim 9, wherein the instructions, when executed by the one or more processors, further cause the image processing apparatus to output a background image of a frame at a capturing time corresponding to a timing at which the image processing apparatus detects a specific voice.

13. The image processing apparatus according to claim 9, wherein the instructions, when executed by the one or more processors, further cause the image processing apparatus to output a background image of a frame at a capturing time corresponding to a timing at which the image processing apparatus detects a specific operation.

14. An image processing method performed by an image processing apparatus, the image processing method comprising:
   specifying, on a basis of a difference between a first region, corresponding to a foreground region of a target frame, in a background image corresponding to the target frame in a buffered frame group and a second region, corresponding to the foreground region, in a background image of each of frames after the target frame in the buffered frame group, a background image among the background images of the frames; and
   outputting the specified background image,
   wherein the difference is obtained sequentially from a background image of a frame having a capturing time earlier than the target frame with respect to a background image of a frame having a capturing time more recent than the target frame in the buffered frame group,
   wherein a background image is specified to be output among the background images of the frames based on the obtained difference, and
   wherein a background image is specified in which the obtained difference is greater than a threshold.

15. A non-transitory computer-readable storage medium storing a computer program for causing a computer to:
   specify, on a basis of a difference between a first region, corresponding to a foreground region of a target frame, in a background image corresponding to the target frame in a buffered frame group and a second region, corresponding to the foreground region, in a background image of each of frames after the target frame in the buffered frame group, a background image among the background images of the frames; and
   output the specified background image,
   wherein the difference is obtained sequentially from a background image of a frame having a capturing time earlier than the target frame with respect to a background image of a frame having a capturing time more recent than the target frame in the buffered frame group,
   wherein a background image is specified to be output among the background images of the frames based on the obtained difference, and
   wherein a background image is specified in which the obtained difference is greater than a threshold.

* * * * *